United States Patent
Meng et al.

(10) Patent No.: US 11,312,005 B2
(45) Date of Patent: Apr. 26, 2022

(54) TWO-DEGREE-OF-FREEDOM PARALLEL ROBOT WITH SPATIAL KINEMATIC CHAIN

(71) Applicant: Tsinghua University, Beijing (CN)

(72) Inventors: Qizhi Meng, Beijing (CN); Xinjun Liu, Beijing (CN); Fugui Xie, Beijing (CN); Jinsong Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 356 days.

(21) Appl. No.: 16/632,372

(22) PCT Filed: Aug. 20, 2019

(86) PCT No.: PCT/CN2019/101544
§ 371 (c)(1),
(2) Date: Jan. 19, 2020

(87) PCT Pub. No.: WO2020/125043
PCT Pub. Date: Jun. 25, 2020

(65) Prior Publication Data
US 2021/0094168 A1    Apr. 1, 2021

(30) Foreign Application Priority Data

Dec. 21, 2018    (CN) .......................... 201811570358.2

(51) Int. Cl.
*B25J 17/00*    (2006.01)
*B25J 17/02*    (2006.01)
*B25J 18/00*    (2006.01)
*B25J 9/00*    (2006.01)
*B25J 9/02*    (2006.01)

(52) U.S. Cl.
CPC .............. *B25J 9/0048* (2013.01); *B25J 9/023* (2013.01)

(58) Field of Classification Search
CPC ....... B25J 17/0266; B25J 9/0048; B25J 9/106
See application file for complete search history.

(56) References Cited

U.S. PATENT DOCUMENTS

2011/0048159 A1*  3/2011  Pierrot ................... B25J 9/0048
                                               74/490.05
2014/0020500 A1*  1/2014  Briot ................... B25J 17/0266
                                               901/15

* cited by examiner

*Primary Examiner* — Jake Cook
(74) *Attorney, Agent, or Firm* — Hodgson Russ LLP

(57) ABSTRACT

A two-degree-of-freedom parallel robot with a spatial kinematic chain includes a fixed platform, a movable platform, two driving devices, and two branch chains. Each driving device includes an active arm and a driving unit, and the two active arms are in the same reference plane. An end bracket is hinged on the active arm. Each branch chain includes two shaft rods and two chain rods. One of the two shaft rods is arranged on the active arm or the end bracket, and the other one thereof is arranged on the movable platform. The two chain rods and the two shaft rods form a parallelogram.

12 Claims, 4 Drawing Sheets

TWO-DEGREE-OF-FREEDOM PARALLEL ROBOT WITH SPATIAL KINEMATIC CHAIN

CROSS-REFERENCE TO RELATED APPLICATION

This application is a U.S. national phase application of International Application No. PCT/CN2019/101544, filed on Aug. 20, 2019, which claims priority to Chinese Patent Application Serial No. 201811570358.2, filed on Dec. 21, 2018, the entire disclosures of which are incorporated herein by reference.

FIELD

The present disclosure relates to a field of parallel robots, and more particularly, to a two-degree-of-freedom parallel robot with a spatial kinematic chain.

BACKGROUND

With the development of industrial level, the application requirements for robots and machine tools are constantly increasing, such as rapid packaging, sorting and handling of light substances in fields of plastic industry, electronic industry, pharmaceutical industry and food industry; cutting, printing and carving of personalized small-scale planar numerical control operations; and metal cutting, material welding and surface coating in the manufacturing field. Analysis shows that for the above two-dimensional point-to-point and arbitrary curvilinear movements, only two degrees of freedom of movement in a plane are needed.

Traditional two-degree-of-freedom mechanisms are mostly implemented in series, and have problems such as error accumulation and large mass of movement components. Different from serial mechanisms, parallel mechanisms are of closed-loop structures constituted by two or more kinematic chains, and have advantages of a compact structure, high rigidity and a large bearing capacity, thus becoming one of the ideal choices for robot and machine tool designs. However, some problems still exist to be solved such as kinematic and structural complexities caused by redundant and passively constrained chains, while the parallel mechanisms in the related art achieve two degrees of freedom in the plane. In a parallel robot disclosed in the related art, a parallel moving member is arranged on an active arm to improve the kinematic performance, but this technical scheme still needs to be improved.

SUMMARY

The present disclosure seeks to solve at least one of the technical problems existing in the related art. Hence, an objective of the present disclosure is to propose a two-degree-of-freedom parallel robot with a spatial kinematic chain. The two-degree-of-freedom parallel robot has characteristics of structural compactness, easy assembly, high control precision and large working space, and can achieve high speed and high acceleration.

According to embodiments of the present disclosure, the two-degree-of-freedom parallel robot includes: a fixed platform; two driving devices, each driving device including an active arm and a driving unit for driving the active arm to rotate, the driving unit being arranged on the fixed platform, and the two active arms being located in the same reference plane; a movable platform having a main plane that is always perpendicular to the reference plane; a branch chain connected between each active arm and the movable platform. Each branch chain includes two shaft rods of equal length and two chain rods of equal length. The two shaft rods are arranged in parallel, one of the two shaft rods is arranged on the active arm, and the other is arranged on the movable platform. Two ends of each chain rod are connected with two shaft rods respectively to form a parallelogram. Spherical articulation is formed between each shaft rod and each chain rod. At least one active arm is hinged with an end bracket, the end bracket is connected with the fixed platform by a reinforcing rod, and the fixed platform, the active arm, the end bracket and the reinforcing rod constitute a parallelogram. When the active arm is directly connected with the branch chain, the active arm is connected with the branch chain. When the active arm is provided with the end bracket, the branch chain is connected to the end bracket so as to be indirectly connected with the active arm, one end bracket is connected with two branch chains, and the two branch chains connected to the same end bracket are symmetrical with respect to the reference plane. In addition, in the two branch chains connected to the same end bracket, the two shaft rods connected to the end bracket form an included angle which is greater than 0 degree but less than 180 degrees, the two shaft rods connected to the movable platform form an included angle which is greater than 0 degree but less than 180 degrees, and the distance between the two shaft rods connected to the end bracket is greater than the distance between the two shaft rods connected to the movable platform. The driving device, the end bracket and the two branch chains connected to the same end bracket together constitute one spatial kinematic chain of the two-degree-of-freedom parallel robot.

For the two-degree-of-freedom parallel robot according to embodiments of the present disclosure, by the arrangement on the two sides of the end bracket, i.e. the interaction between the combination of the active arm and the reinforcing rod and the combination of two chains, the parallel robot overall has large rigidity, high control precision, easy assembly, outstanding performance consistency and retention.

In some embodiments, in each branch chain, at least one anti-torsion rod is connected between the two chain rods, and the anti-torsion rod and the shaft rod have equal length and are arranged in parallel.

Specifically, each chain rod is provided with a slide hole extending along a length direction thereof, and a rotating shaft of the anti-torsion rod passes through the slide hole.

In some embodiments, the movable platform includes a center plate and a plurality of pairs of ear plates, each pair of ear plates is connected to an outer periphery of the center plate, each pair of ear plates comprises two ear plates provided with ear holes and spaced apart from each other, and each shaft rod is connected to the ear holes of one pair of ear plates.

In some embodiments, the active arm is provided with a weight reduction hole.

In some embodiments, the end bracket includes: a support plate, the active arm is hinged with the support plate; a pair of upper extended ears provided on one side of the support plate, and the reinforcing rod being hinged between the pair of upper extended ears; two pairs of lower extended ears connected on the other side of the support plate, each pair of lower extended ears being connected with one shaft rod of the branch chain.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of the present disclosure will become apparent and readily appreciated from the following descriptions of the embodiments made with reference to the drawings, in which.

Figure 1:
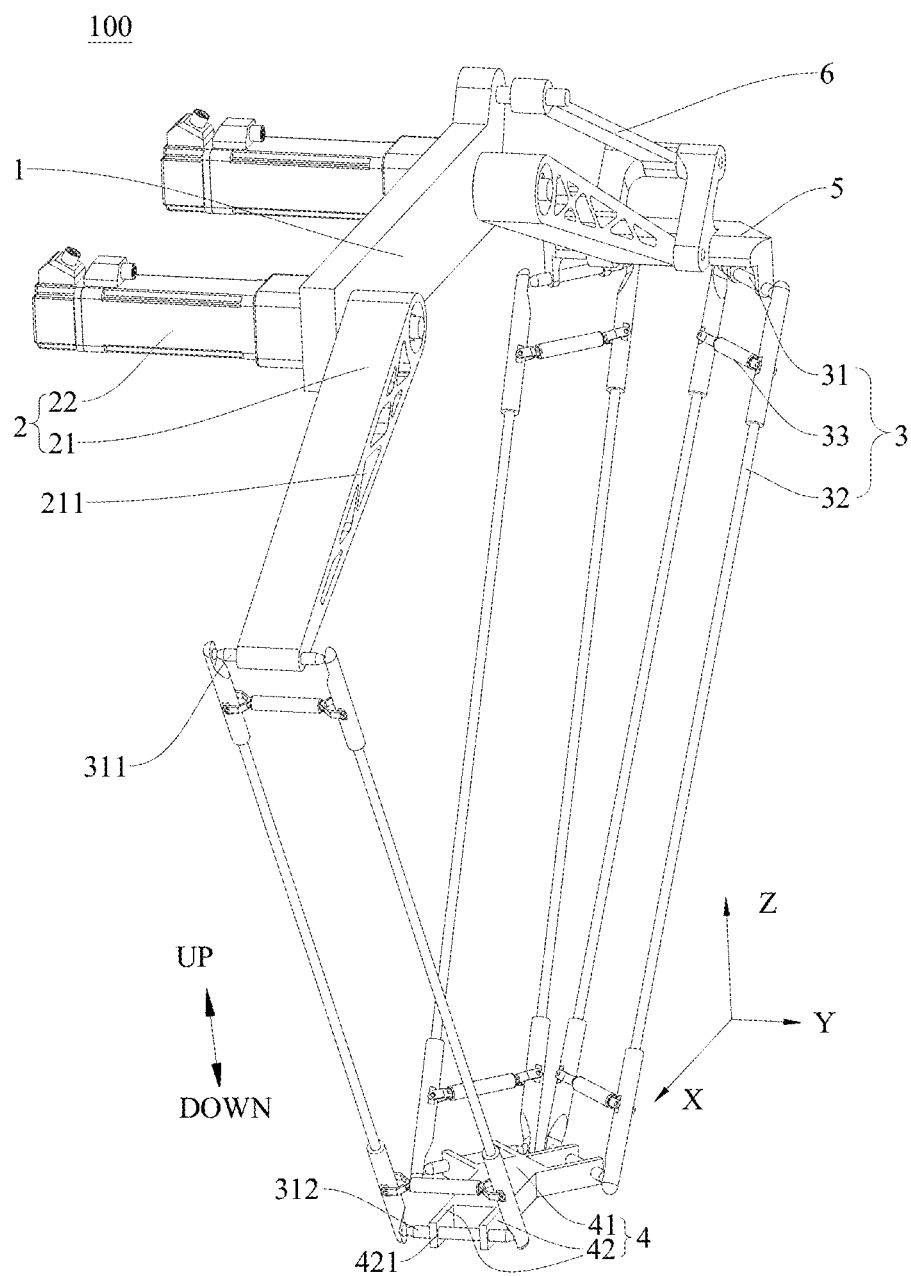
FIG. 1 is a schematic structural diagram of a two-degree-of-freedom parallel robot with a spatial kinematic chain according to a first embodiment of the present disclosure.

REFERENCE NUMERALS two-degree-of-freedom parallel robot 100,
fixed platform 1
driving device 2, active arm 21, weight reduction hole 211, driving unit 22,
branch chain 3, shaft rod 31, upper shaft rod 311, lower shaft rod 312, chain rod 32, slide hole 321, anti-torsion rod 33,
movable platform 4, center plate 41, ear plate 42, ear hole 421,
end bracket 5, support plate 51, upper extended ear 52, lower extended ear 53
reinforcing rod 6.

DETAILED DESCRIPTION

Embodiments of the present disclosure are described in detail below. The examples of embodiments are illustrated in the attached drawings. The embodiments described herein with reference to drawings are exemplary and used to generally explain the present disclosure, and cannot be construed as limitation to the present disclosure.

In the specification of the present disclosure, it is to be understood that, terms such as "central," "upper," "lower," "vertical," "horizontal," and the like indicate the orientation or position relationship as then described or as illustrated in the drawings under discussion. These relative terms are only for convenience and simplification of description, and do not indicate or imply that the device or element referred to must have a particular orientation or be constructed and operated in a specific orientation, so these terms shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may include at least one of the features. In the description of the present disclosure, "a plurality of" means at least two, such as two, three and the like, unless specified otherwise.

In the present disclosure, it should be noted, unless specified or limited otherwise, the terms "mounted," "connected," "coupled," "fixed" or the like are used broadly. The terms may indicate, for example, fixed connections, detachable connections, or integral connections, may also indicate mechanical or electrical connections or mutual communication, may also indicate direct connections or indirect connections via intermediate media, and may also indicate inner communications or mutual interaction of two elements, unless specified otherwise. The specific meanings of the terms in embodiments of the present disclosure can be understood by those skilled in the art according to specific circumstances.

A two-degree-of-freedom parallel robot 100 with a spatial kinematic chain according to embodiments of the present disclosure will be described below with reference to FIGS. 1-4.

Figure 2:
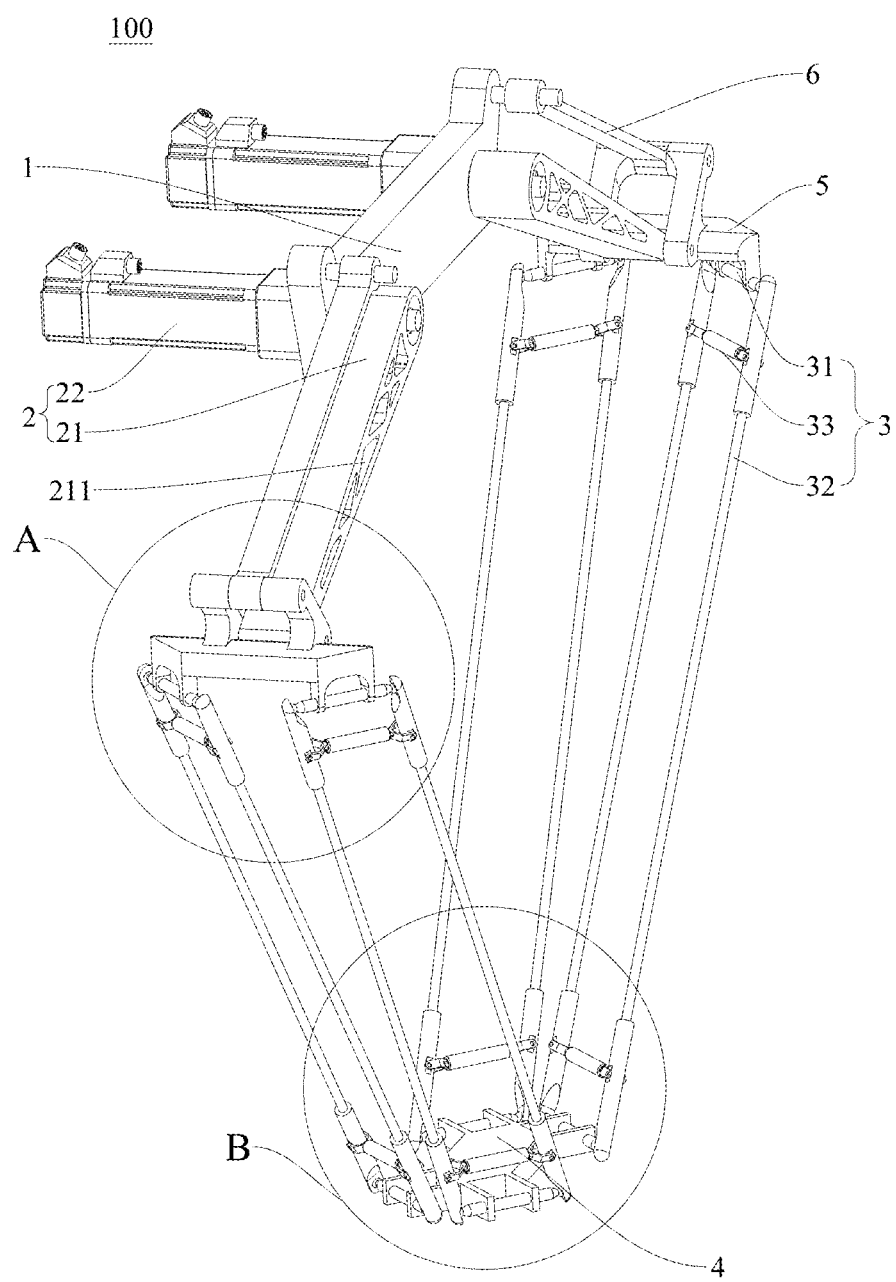
FIG. 2 is a schematic structural diagram of a two-degree-of-freedom parallel robot with a spatial kinematic chain according to a second embodiment of the present disclosure.

According to the embodiments of the present disclosure, the two-degree-of-freedom parallel robot 100, as illustrated in FIG. 1 and FIG. 2, includes a fixed platform 1, two driving devices 2, a movable platform 4, and a branch chain 3.

The two driving devices 2 are arranged on the fixed platform 1. Each driving device 2 includes one active arm 21 and a driving unit 22 for driving the active arm 21 to rotate. The driving unit 22 is arranged on the fixed platform 1, and the two active arms 21 are located in the same reference plane. In other words, one end of each active arm 21 can be pivotally connected to the fixed platform 1, and pivot axes of the two active arms 21 are parallel to each other, in which the plane constituted by the two active arms 21 is called the reference plane.

The movable platform 4 has a main plane which is always perpendicular to the reference plane. Since the movable platform 4 has the main plane that is a virtual plane, it indicates that the moving mode of the movable platform 4 relative to the reference plane is limited, and the movable platform 4 can merely translate along the reference plane, or the rotation axis of the movable platform 4 can only be perpendicular to the reference plane.

Figure 3:
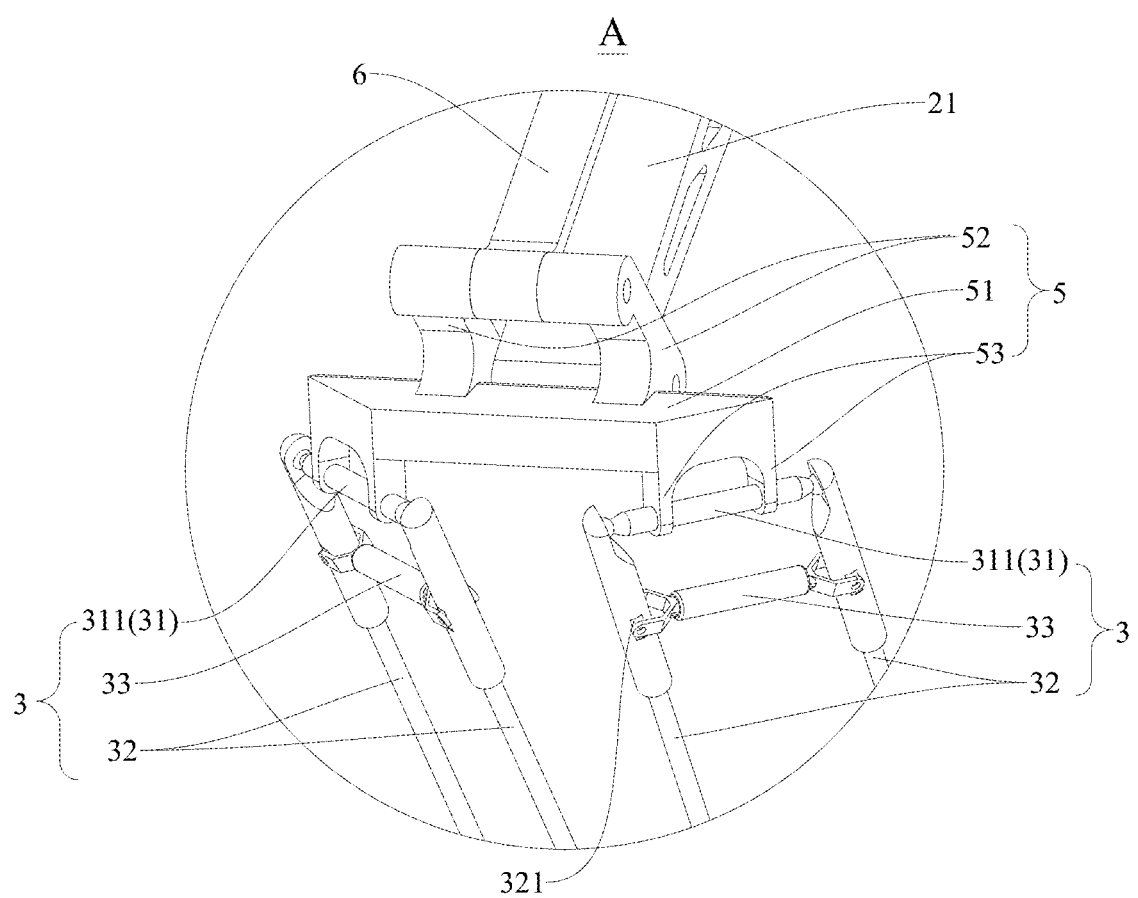
FIG. 3 is an enlarged view of area A circled in FIG. 2.
Figure 4:
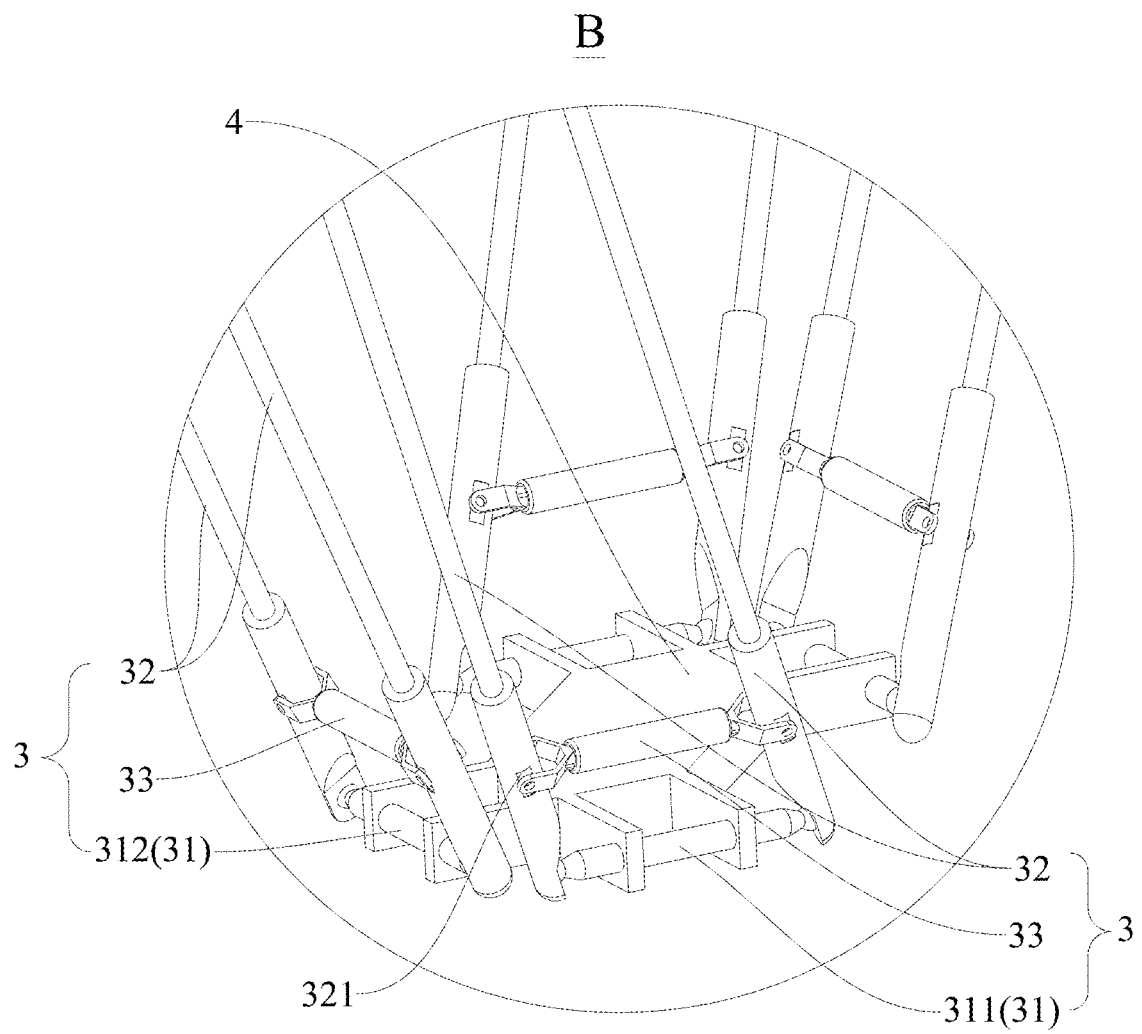
FIG. 4 is an enlarged view of area B circled in FIG. 2.

As illustrated in FIG. 1 and FIG. 2, the branch chain 3 is connected between each active arm 21 and the movable platform 4, and the branch chain 3 is a parallelogram rod group. Each branch chain 3 includes two shaft rods 31 of equal length and two chain rods 32 of equal length. The two shaft rods 31 are arranged in parallel, one of the two shaft rods 31 is arranged on the active arm 21, and the other one is arranged on the movable platform 4. Two ends of the two chain rods 32 are connected with the two shaft rods 31 respectively. Here, each branch chain 3 is a four-link structure having four connection points. The equal length of the two shaft rods 31 means that respective portions of the two shaft rods 31 between the connection points have the same length, and the equal length of the two chain rods 32 means that respective portions of the two chain rods 32 between the connection points have the same length. The two shaft rods 31 and the two chain rods 32 of one branch chain 3 form a parallelogram. As illustrated in FIG. 3 and FIG. 4, it should be emphasized herein that spherical articulation is formed between each shaft rod 31 and each chain rod 32 so as to ensure the flexibility when the shape of the parallelogram changes.

At least one active arm 21 is hinged with an end bracket 5, and the end bracket 5 is connected with the fixed platform 1 by a reinforcing rod 6, such that the fixed platform 1, the active arm 21, the end bracket 5, and the reinforcing rod 6 constitute a parallelogram.

As illustrated in FIG. 1, when the active arm 21 is directly connected with the branch chain 3, the active arm 21 is connected with one branch chain 3. As illustrated in FIG. 1 and FIG. 2, when the active arm 21 is provided with the end bracket 5, the branch chain 3 is connected to the end bracket 5, so as to be indirectly connected with the active arm 21, and one end bracket 5 is connected with two branch chains 3. Moreover, when the branch chain 3 is connected with the active arm 21 by the end bracket 5, the shaft rod 31 on the end bracket 5 is non-coaxial with a rotating shaft of the active arm 21, and the two branch chains 3 connected to the same end bracket 5 are symmetrical with respect to the reference plane.

Moreover, in the two branch chains 3 connected to the same end bracket 5, the two shaft rods 31 connected to the end bracket 5 form an included angle which is greater than 0 degree but less than 180 degrees, and the two shaft rods 31 connected to the movable platform 4 form an included angle which is greater than 0 degree but less than 180 degrees. In the two branch chains 3 on the same end bracket 5, the distance between the two shaft rods 31 connected to the end bracket 5 is greater than the distance between the two shaft rods 31 connected to the movable platform 4. The driving device 2, the end bracket 5, and the two branch chains 3 connected to the same end bracket 5 together constitute one spatial kinematic chain of the two-degree-of-freedom parallel robot 100.

That is, in the present disclosure, the two-degree-of-freedom parallel robot 100 can have two basic configurations, which are illustrated in FIG. 1 and FIG. 2 respectively.

In FIG. 1, the fixed platform 1 is connected with two driving devices 2, and each of the driving devices 2 includes one active arm 21 and a driving unit 22 for driving the active arm 21 to rotate. The end of one active arm 21 is not connected with the end bracket 5, and the end of the other active arm 21 is connected with one end bracket 5. A reinforcing rod 6 is also connected between the end bracket 5 and the fixed platform 1. The fixed platform 1, the active arm 21, the end bracket 5, and the reinforcing rod 6 constitute a parallelogram.

The active arm 21 without connecting the end bracket 5 is merely connected with one branch chain 3, while the end bracket 5 is connected with two branch chains 3. Each branch chain 3 includes: two shaft rods 31 and two chain rods 32. The two shaft rods 31 are arranged in parallel, one of the two shaft rods 31 is arranged on the active arm 21, and the other one thereof is arranged on the movable platform 4. Two ends of the two chain rods 32 are connected with the two shaft rods 31 respectively. Two shaft rods 31 and two chain rods 32 of one branch chain 3 form a parallelogram. Spherical articulation is formed between each shaft rod 31 and each chain rod 32.

For convenience of description, referring to the direction illustrated in FIG. 1, the movable platform 4 in FIG. 1 is located below the fixed platform 1, the shaft rod 31 connected with the active arm 21 is called an upper shaft rod 311, and the shaft rod 31 connected with the movable platform 4 is called a lower shaft rod 312. Positions of various components will be described below with reference to the directions illustrated in FIG. 1. Certainly, FIG. 1 is only exemplary, and does not indicate or imply that the device or element referred to must have a particular orientation or be constructed and operated in a specific orientation. Besides, the Cartesian coordinate system composed of X-axis, Y-axis and Z-axis is also introduced in FIG. 1, in order to facilitate the following description on the working principle of the parallel robot with reference to the drawings. In the Cartesian coordinate system, the Z-axis direction is equivalent to an up-and-down direction.

In the two branch chains 3 on the same end bracket 5, two upper shaft rods 311 define an included angle which is greater than 0 degree and less than 180 degrees, two lower shaft rods 312 define an included angle which is greater than 0 degree and less than 180 degrees, and the distance between the two branch chains 3 on the end bracket 5 is greater than the distance between the two branch chains 3 on the movable platform 4. The driving device 2, the end bracket 5, and the two branch chains 3 connected to the end bracket 5 together constitute one spatial kinematic chain of the two-degree-of-freedom parallel robot 100.

The basic configuration of the two-degree-of-freedom parallel robot 100 illustrated in FIG. 1 completely limits three rotational degrees of freedom of the movable platform 4 around the X-axis, the Y-axis and the Z-axis, and also limits one translational degree of freedom of the movable platform 4 along the Y-axis. The two-degree-of-freedom parallel robot 100 can achieve the two degrees of freedom of movement along the X-axis and the Z-axis and have characteristics of structural compactness, easy assembly, high control precision and large working space, and can achieve features of high speed and high acceleration.

In FIG. 2, the fixed platform 1 is connected with two driving devices 2, and each of the driving devices 2 includes one active arm 21 and a driving unit 22 for driving the active arm 21 to rotate. The end of each active arm 21 is connected with the end bracket 5, and the reinforcing rod 6 is connected between each end bracket 5 and the fixed platform 1. On both sides of the fixed platform 1, the fixed platform 1, the active arm 21, the end bracket 5, and the reinforcing rod 6 together constitute a parallelogram.

Each of the two end brackets 5 is connected with two branch chains 3. Each branch chain 3 includes two shaft rods 31 and two chain rods 32. The two shaft rods 31 are the upper shaft rod 311 and the lower shaft rod 312 arranged in parallel. The upper shaft rod 311 is arranged on the end bracket 5, the lower shaft rod 312 is arranged on the movable platform 4, and the two ends of the two chain rods 32 are connected with the two shaft rods 31 respectively. The two shaft rods 31 and the two chain rods 3 of one branch chain 32 form a parallelogram, and spherical articulation is formed between each shaft rod 31 and each chain rod 32.

In the two branch chains 3 on the same end bracket 5, the two upper shaft rods 311 define an included angle which is greater than 0 degree and less than 180 degrees, the two lower shaft rods 312 define an included angle which is greater than 0 degree and less than 180 degrees, and the distance between the two branch chains 3 on the end bracket 5 is greater than the distance between the two branch chains 3 on the movable platform 4. Each driving device 2, the corresponding end bracket 5 and the two branch chains 3 connected to the end bracket 5 constitute one spatial kinematic chain of the two-degree-of-freedom parallel robot 100, and hence the two-degree-of-freedom parallel robot 100 has two spatial kinematic chains.

The basic configuration of the two-degree-of-freedom parallel robot 100 illustrated in FIG. 2 is an enhanced version of the basic configuration of the two-degree-of-freedom parallel robot 100 illustrated in FIG. 1. The two-degree-of-freedom parallel robot 100 illustrated in FIG. 2 can also achieve the four-degree-of-freedom limitation scheme that limits the three rotational degrees of freedom around X-axis, Y-axis and Z-axis and one translational degree of freedom along Y-axis of the two-degree-of-freedom parallel robot 100 illustrated in FIG. 1. That is, the two-degree-of-freedom parallel robot 100 illustrated in FIG. 2 can also achieve the two degrees of freedom of movement along the X-axis and the Z-axis. Moreover, in the two-degree-of-freedom parallel robot 100 illustrated in FIG. 2, each of the two active arms 21 is connected with the two branch chains 3 by means of the end bracket 5 to form a redundant structure, so as to further improve the rigidity of the robot and the output characteristics of the end of the movable platform 4.

The two-degree-of-freedom parallel robot 100 according to the embodiments of the present disclosure has the following advantages:

1. The arrangement on the two sides of the end bracket 5, i.e., the interaction between the combination of the active arm 21 and the reinforcing rod 6 and the combination of the two chains, strictly limits the four degrees of freedom of the movable platform 4. When the movable platform 4 only has two degrees of freedom, the whole machine has large rigidity, high control precision, easy assembly, outstanding performance consistency and retention.

2. The driving unit 22 is fixed on the fixed platform 1 instead of moving along with a driving chain like the traditional serial robot. The arrangement is conducive to achieving lightweight of the driving chain, and improving the dynamic response performance of the driving chain. Moreover, the driving chain can reduce energy consumption by getting rid of the burden of the driving unit 22.

The driving unit 22 is preferably an electric motor, and certainly, in other embodiments of the present disclosure, a hydraulic driving mechanism may also be used to replace the electric motor. For example, when several two-degree-of-freedom parallel robots 100 are operated on a production line, a hydraulic cylinder can be applied to transmit power to each active arm 21 (by pistons, gear systems, and etc.), and the linkage arrangement cost can be effectively controlled.

Specifically, both ends of each chain rod 32 are provided with hinge holes, an inner wall surface of the hinge hole is a spherical surface, both ends of the shaft rod 31 are formed as ball heads, and the ball heads at both ends of the shaft rod 31 are fitted in the hinge holes of the two chain rods 32, so as to form the spherical articulation.

In some embodiments, as illustrated in FIGS. 1-4, in each branch chain 3, at least one anti-torsion rod 33 is connected between the two chain rods 32, and the anti-torsion rod 33 and the shaft rod 31 have equal length and are arranged in parallel. The anti-torsion rod 33 can effectively avoid the torsion of the branch chain 3 and ensure the stability of the branch chain 3.

Specifically, as illustrated in FIG. 3 and FIG. 4, each chain rod 32 is provided with a slide hole 321 extending along a length direction thereof, and a rotating shaft of the anti-torsion rod 33 passes through the slide hole 321. With the arrangement of the slide hole 321, the self-adaptability of the branch chain 3 at various angles can be improved, and the flexibility is enhanced.

In some embodiments, as illustrated in FIG. 1, the movable platform 4 includes a center plate 41 and a plurality of pairs of ear plates 42. Each pair of ear plates 42 is connected to an outer periphery of the center plate 41, each pair of ear plates 42 includes two spaced ear plates 42 having ear holes 421, and each shaft rod 31 is connected to the ear holes 421 of one pair of ear plates 42. The movable platform 4 has a simple structure and is easy to assemble.

In some embodiments, the active arm 21 is provided with a weight reduction hole 211. The arrangement of the weight reduction hole 211 can reduce the weight of the active arm 21 and enhance the dynamic characteristics of the robot.

In some embodiments, as illustrated in FIG. 3, the end bracket 5 includes a support plate 51, one pair of upper extended ears 52, and two pairs of lower extended ears 53. The active arm 21 is hinged with the support plate 51, the pair of upper extended ears 52 is arranged on one side of the support plate 51, and the reinforcing rod 6 is hinged between the pair of upper extended ears 52. The two pairs of lower extended ears 53 are connected on the other side of the support plate 51, and each pair of lower extended ears 53 is connected with one shaft rod 31 of the branch chain 3.

Other components (like the electric motor) and operations of the two-degree-of-freedom parallel robot 100 with the spatial kinematic chains according to embodiments of the present disclosure are generally known by those skilled in the art and thus will not be described in detail herein.

Reference throughout this specification to terms "an embodiment," "an example", means that a particular feature, structure, material, or characteristic described in connection with the embodiment or example is included in at least one embodiment or example of the present disclosure. In this specification, the appearances of the above terms are not necessarily referring to the same embodiment or example. Moreover, the particular features, structures, materials, or characteristics described may be combined in any suitable manner in one or more embodiments or examples.

Although embodiments of the present disclosure have been illustrated and described above, it should be understood by those skilled in the art that changes, modifications, alternatives, and variations can be made in the embodiments without departing from principles and purposes of the present disclosure. The scope of this disclosure is limited by the claims and their equivalents.

The invention claimed is:

1. A two-degree-of-freedom parallel robot with a spatial kinematic chain, comprising:
   a fixed platform;
   two driving devices, each driving device comprising an active arm and a driving unit for driving the active arm to rotate, the driving unit being arranged on the fixed platform, and the two active arms being located in the same reference plane;
   a movable platform having a main plane that is always perpendicular to the reference plane;
   a branch chain connected between each active arm and the movable platform, wherein each branch chain comprises two shaft rods of equal length and two chain rods of equal length; the two shaft rods are arranged in parallel, one of the two shaft rods being arranged on the active arm, and the other one thereof being arranged on the movable platform; two ends of each chain rod are connected with the two shaft rods to form a parallelogram; and spherical articulation is formed between each shaft rod and each chain rod;
   wherein at least one active arm is hinged with an end bracket, the end bracket is connected with the fixed platform by a reinforcing rod, and the fixed platform, the active arm, the end bracket and the reinforcing rod constitute a parallelogram; and
   wherein when the active arm is directly connected with the branch chain, the active arm is connected with one branch chain;
   wherein when the active arm is provided with the end bracket, the branch chain is connected to the end bracket so as to be indirectly connected with the active arm, one end bracket is connected with two branch chains, and the two branch chains connected to the same end bracket are symmetrical with respect to the reference plane;
   wherein in the two branch chains connected to the same end bracket, the two shaft rods connected to the end bracket define an included angle of greater than 0 degree but less than 180 degrees, the two shaft rods connected to the movable platform define an included angle of greater than 0 degree but less than 180 degrees, and a distance between the two shaft rods connected to the end bracket is greater than a distance between the two shaft rods connected to the movable platform;

wherein the driving device, the end bracket and the two branch chains connected to the same end bracket together constitute one spatial kinematic chain of the two-degree-of-freedom parallel robot.

2. The two-degree-of-freedom parallel robot according to claim 1, wherein in each branch chain, at least one anti-torsion rod is connected between the two chain rods, and the anti-torsion rod and the shaft rod have equal length and are arranged in parallel.

3. The two-degree-of-freedom parallel robot according to claim 2, wherein each chain rod is provided with a slide hole extending along a length direction of the chain rod, and a rotating shaft of the anti-torsion rod passes through the slide hole.

4. The two-degree-of-freedom parallel robot according to claim 1, wherein the movable platform comprises a center plate and a plurality of pairs of ear plates, each pair of ear plates is connected to an outer periphery of the center plate, each pair of ear plates comprises two ear plates provided with ear holes and spaced apart from each other, and each shaft rod is connected to the ear holes of one pair of ear plates.

5. The two-degree-of-freedom parallel robot according to claim 1, wherein the end bracket comprises:
 a support plate, the active arm being hinged with the support plate;
 a pair of upper extended ears provided on one side of the support plate, the reinforcing rod being hinged between the pair of upper extended ears;
 two pairs of lower extended ears connected on the other side of the support plate, each pair of lower extended ears being connected with one shaft rod of the branch chain.

6. The two-degree-of-freedom parallel robot according to claim 2, wherein the movable platform comprises a center plate and a plurality of pairs of ear plates, each pair of ear plates is connected to an outer periphery of the center plate, each pair of ear plates comprises two ear plates provided with ear holes and spaced apart from each other, and each shaft rod is connected to the ear holes of one pair of ear plates.

7. The two-degree-of-freedom parallel robot according to claim 3, wherein the movable platform comprises a center plate and a plurality of pairs of ear plates, each pair of ear plates is connected to an outer periphery of the center plate, each pair of ear plates comprises two ear plates provided with ear holes and spaced apart from each other, and each shaft rod is connected to the ear holes of one pair of ear plates.

8. The two-degree-of-freedom parallel robot according to claim 2, wherein the end bracket comprises:
 a support plate, the active arm being hinged with the support plate;
 a pair of upper extended ears provided on one side of the support plate, the reinforcing rod being hinged between the pair of upper extended ears;
 two pairs of lower extended ears connected on the other side of the support plate, each pair of lower extended ears being connected with one shaft rod of the branch chain.

9. The two-degree-of-freedom parallel robot according to claim 3, wherein the end bracket comprises:
 a support plate, the active arm being hinged with the support plate;
 a pair of upper extended ears provided on one side of the support plate, the reinforcing rod being hinged between the pair of upper extended ears;
 two pairs of lower extended ears connected on the other side of the support plate, each pair of lower extended ears being connected with one shaft rod of the branch chain.

10. The two-degree-of-freedom parallel robot according to claim 4, wherein the end bracket comprises:
 a support plate, the active arm being hinged with the support plate;
 a pair of upper extended ears provided on one side of the support plate, the reinforcing rod being hinged between the pair of upper extended ears;
 two pairs of lower extended ears connected on the other side of the support plate, each pair of lower extended ears being connected with one shaft rod of the branch chain.

11. The two-degree-of-freedom parallel robot according to claim 1, wherein the active arm is provided with a weight reduction hole.

12. The two-degree-of-freedom parallel robot according to claim 1, wherein both ends of each chain rod are provided with hinge holes, an inner wall surface of the hinge hole is a spherical surface, both ends of the shaft rod are formed as ball heads, and the ball heads at both ends of the shaft rod are fitted in the hinge holes of the two chain rods.

\* \* \* \* \*